UNITED STATES PATENT OFFICE 3,741,774
Patented June 26, 1973

3,741,774
PREPARATION OF A HIGH PROTEIN SIMULATED CHEESE PRODUCT
Morris P. Burkwall, Jr., Barrington, Ill., assignor to The Quaker Oats Company, Chicago, Ill.
No Drawing. Filed Mar. 23, 1970, Ser. No. 22,025
Int. Cl. A23c 19/12
U.S. Cl. 99—117     1 Claim

ABSTRACT OF THE DISCLOSURE

A high protein simulated cheese product is prepared by forming a mixture of specified amounts of cheese, pregelatinized starch, a high protein binding agent, water and sugar or sugar equivalents. The mixture is heated to 125° F. to 195° F. and while at a temperature within this range it is extruded into small strands.

BACKGROUND OF THE INVENTION

Field of the invention.—This invention relates to a simulated cheese product having a high protein content. The product is particularly suitable as a pet food or for human consumption.

Description of the prior art.—Cheese products have long been known and have long been recognized to have many advantages as food products. Prior attempts to produce simulated cheese products, however, have not generally achieved the quality required to attain commercial acceptability. These prior simulated products have generally been unsuitable in one or more of the following areas: shelf stability; cost; melting point; and nutrition-protein content. The product herein claimed satisfies all of these requirements as well as providing a good tasting product. This invention, therefore, significantly advances any prior art in the field of simulated cheese products.

SUMMARY OF THE INVENTION

It is an object of this invention to provide a high protein simulated cheese product which is shelf stable at room temperature for up to six months with substantially full retention of the cheese aroma and taste.

It is another object of this invention to provide a high protein simulated cheese product which is lower in cost than natural cheeses or processed pasteurized cheese products.

It is another object of this invention to provide a high protein simulated cheese product which will not melt at a temperature of about 200° F., a point at which most cheeses or cheese products melt.

It is a further object of this invention to provide a high protein simulated cheese product which is highly nutritious and which contains large amounts of protein.

It is a still further object of this invention to provide a process for producing a high protein simulated cheese product.

The objects of this invention are accomplished by a high protein simulated cheese product comprising from about 1 percent to about 25 percent by weight cheese; from about 5 percent to about 35 percent by weight of a member selected from the group consisting essentially of sugar, sugar equivalents, and mixtures thereof; from 5 percent to 30 percent by weight pregelatinized starch; from 10 percent to 50 percent by weight of a high protein binding agent; and sufficient water to give a final moisture content of from 20 percent to 40 percent by weight; wherein the total weight percentage is equal to 100 percent.

The objects of this invention are further accomplished by a process for producing a high protein simulated cheese product comprising mixing from about 1 percent to about 25 percent by weight cheese; from about 5 percent to about 35 percent by weight of a member selected from the group consisting essentially of sugar, sugar equivalents, or mixtures thereof; from 5 percent to 30 percent by weight pregelatinized starch; from 10 percent to 50 percent by weight of a high protein binding agent; and sufficient water to give a final moisture content of from 20 percent to 40 percent by weight; wherein the total weight percentage is equal to 100 percent; then forming the mixture into the shape of a cheese food product.

It is preferred that the high protein simulated cheese product also contain from 1 percent to 7 percent by weight of an edible oil.

In the process for producing this new and novel high protein simulated cheese product it is also preferred to heat the mixture to a temperature of from about 125° F. to about 195° F. and thereafter extrude the heated mixture into small strands.

I have found that the high protein simulated cheese product of this invention should include from about 1 percent to about 25 percent by weight cheese. The lower limit of about 1 percent by weight cheese may be more fully defined as a sufficient amount of cheese to impart a cheese-like taste to the simulated product. The upper limit of about 25 percent by weight cheese is a limit at which additional cheese begins to destroy the cohesiveness of the mixtures.

By use of the term "cheese" herein I intend to mean the common usage of the term. This definition generally may be said to be a concentration of all or part of the components of milk obtained through the coagulation of casein by a suitable enzyme and/or by acid produced bacteria. Many types of cheese are known to the industry including Asiago, Bel Paese, blue, brick, Brie, caciocavallo, Camembert, Cheddar, Colby, cottage, cream, Edam, gjetost, Gorgonzola, Gouda, Gruyere, Limburger, Monterey, mozzarella, Muenster, Neufchatel, Parmesan, Port du Salut, primost, provolone, ricotta, Roquefort, sapsago, Stilton, Swiss. The term "cheese" also includes dehydrated cheese as well as enzyme modified cheese, cheese solids, and cheese concentrates as well as combinations thereof. When a dehydrated cheese is used, it is obvious that more water will have to be later added to increase the moisture content to the desired level. Artificial and natural cheese flavors may naturally be used to enhance the cheese flavor and minimize the amount of cheese required to impart the desired flavor. I have found a particularly acceptable product can be produced by mixture of about 8 parts by weight dehydrated cheddar cheese mixed with about 2 parts by weight dehydrated blue cheese.

The high protein simulated cheese product of this invention must include from about 5 percent to about 35 percent by weight of a member selected from the group consisting essentially of sugar, sugar equivalents, and mixtures thereof. By use herein of the term "sugar" I intend to mean any saccharide which is soluble in water to an extent that the osmotic pressure of a water solution of such a saccharide will provide the requisite bacteriostatic effect. In addition, the saccharide is required to be nontoxic. The saccharide must not provide any undesirable taste effects when used in the required concentration. It is preferred that the sugar be a low molecular weight sugar since sugars of a lower molecular weight have a more pronounced effect in increasing the osmotic pressure of a sugar solution than do sugars of a higher molecular weight. Among the sugars that may be used for this invention are the nonreducing and reducing water soluble monosaccharides; the reducing and nonreducing polysaccharides and their degradation products such as pentoses, aldopentoses, methylpentoses, ketopentoses, e.g. xylose and arabinose; rhamnose; hexoses and reducing polysaccharides; aldohexoses like glucose, galactose and mannose; the ketohexoses including fructose and sorbose; the disaccharides including maltose and lactose; the nonreducing disaccharides such as sucrose; and other polysaccharides such as dextrin and raffinose and hydrolyzed starches which contain as their constituents oligosaccharides.

By use of the term "sugar equivalents" I intend to mean a compound which can be added to the mixture to produce the same effect on osmotic pressure as would sugar. Generally the sugar equivalents include the polyhydric alcohols which are nontoxic and which do not adversely affect the taste in the concentrations specified. By the term "polyhydric alcohols" I generally intend to mean alcohols with three or more hydroxyl groups and having the general formula $HOCH_2(CHOH)_mCH_2OH$ where $m$ is a number from 1–5. Generally, these polyhydric alcohols are water soluble, have small optical rotation in water and have some sweetness to taste. Among the polyhydric alcohols that may be used in this invention are the following:

tritols
    glycerol
tetritols
    erythritol
    D-threitol
    L-threitol
    D,L-threitol
pentitols
    ribitol
    xylitol
    D-arabitol
    L-arabitol
hexitols
    allitol
    dulcitol
    sorbitol (D-glucitol)
    L-glucitol
    D,L-glucitol
    D-mannitol
    L-mannitol
    D,L-mannitol
    D-talitol
    L-talitol
    D,L-talitol
    D-iditol
    L-iditol
heptitols
    glycero-gluo-heptitol
    D-glycero-D-ido-heptitol
    perseitol
    volemitol
octitol
    D-erythro-D-galacto-octitol.

The term sugar equivalent also includes the higher sugar alcohols. Glycerol and propylene glycol are acceptable "sugar equivalents" and are particularly useful in this invention. As used herein, the product should contain sugar or a sugar equivalent or mixtures thereof. When using mixtures of the sugar and sugar equivalents, care must be taken to insure that the amount used reduces the osmotic pressure of the product to the extent that it imparts therein a bacteriostatic effect.

The product of this invention contains from 5 percent to 30 percent by weight pregelatinized starch. Any of the common commercial starches are acceptable for use in this invention. I have found it particularly acceptable to use a pregelatinized tapioca starch, but this invention is not limited to tapioca as the only type of starch since other types of starch such as corn starch, wheat starch, waxy maize starch, etc, are also acceptable.

By use of the term "pregelatinized" with reference to the starch, I intend to mean starch that is gelatinized prior to addition to the mix or else is partly or slightly gelatinized prior to addition to the mix and then gelatinized by the processing conditions.

The high protein simulated cheese product of this invention also includes from 10 percent to 50 percent by weight of a high protein binding agent. The high protein binding agent should have a protein content which when combined with the protein content of the cheese provides at least from about 20 to 25 percent by weight protein in the finished product. It is generally preferred to use as a binding agent a soybean flour which has been concentrated to provide in the flour at least 50 percent by weight protein. Any of the known high protein binding agents may be used in place of the soy flour, however, including such things as casein, caseinate salts, albumin, and whey. Also acceptable as protein binding agents are non-fat milk solids, cereal proteins such as wheat gluten and corn zein, and the common oilseed proteins.

The high protein simulated cheese product of this invention contains from 20 percent to 40 percent by weight water as a final moisture content. Although the water content of this product would generally be expected to result in serious bacterial problems, this has been essentially eliminated by the use herein of the sugar, sugar equivalents, and mixtures thereof to provide a bacteriostatic effect.

The high protein simulated cheese product of this invention may also contain from 1 percent to about 7 percent by weight of an edible fat or oil where desired to increase the fat content of this product. The term "edible fat or oil" as used herein refers to the common usage of the term including those that are solid and those that are liquid at room temperature.

Depending upon the intended use of the product various other standard food additives may be desirable in order to provide certain flavor, nutrition, color, or texture characteristics or to assist in the preservative action.

The process for producing my new and unique high protein simulated cheese product comprises mixing from about 1 percent to about 25 percent by weight cheese; from about 5 percent to about 35 percent by weight of a member selected from the group consisting essentially of sugar, sugar equivalents, and mixtures thereof; from 5 to 30 percent by weight pregelatinized starch; from 10 percent to 50 percent by weight of a high protein binding agent; and sufficient water to bring the final moisture content to from 20 percent to 40 percent by weight; and forming the mixture into the shape of a cheese food product. In preparing this product it is essential that the mixing of the ingredients be sufficiently thorough so that each of the ingredients will be uniformly distributed throughout the product. The mixture can then be formed into any desired cheese food shape. For instance, the product can be extruded into small strands and compressed to give the effect of cheese melted on cooked hamburger. The product can also be formed into small blocks to imitate conventional cheese.

I have found it is particularly acceptable to produce a cheese product by mixing the ingredients together, heating the mixture to a temperature of from about 125° F. to about 195° F. and thereafter extruding the heated mixture into small strands. While higher extrusion temperatures may be used to give an acceptable product, such is not the preferred conditions since the higher temperatures tend to cause a loss of the volatile aroma and flavor components of the cheese.

DESCRIPTION OF THE PREFERRED EMBODIMENTS

The following example may be taken to constitute one of the preferred embodiments of this invention although the invention is not limited to the embodiment illustrated.

Example

The following ingredients were admixed (parts refers to parts by weight):

5 parts cheese
    4 parts dehydrated Cheddar cheese
    1 part dehydrated blue cheese
18 parts sugar and sugar equivalent
    13 parts sucrose
    5 parts glycerol
16 parts pregelatinized tapioca starch
23 parts high protein binding agent
    17 parts of 50% protein soy flour,
    5 parts sodium caseinate,
    1 part dried whey
0.3 part potassium sorbate
28 parts water.

After the ingredients were thoroughly mixed, the mixture was placed in an extruder wherein the mixture was heated to about 150° F., and the heated mixture was then extruded into small strands. The small strands of simulated cheese product were highly acceptable in taste and other characteristics.

The particular advantages of the product of this invention are numerous. First, the product is shelf stable at room temperature for up to six months with substantially full retention of the cheese aroma and taste. While some cheeses have a certain degree of shelf stability, none of them approch the product of this invention for stability with substantial retention of aroma and taste. Prior simulated cheese products have either not been shelf stable with a retention of aroma and taste or else have encountered serious bacterial problems.

The product of this invention is substantially free from bacteriological problems and does not therefore need to be canned or aseptically packed. Since this product includes ingredients which are of a lower cost than the natural cheeses, the product of this invention is a lower cost simulated cheese product.

One particular advantage of this product is the fact that it will not melt when heated to about 200° F. as will most cheese products. This is particularly advantageous in the shipping and storage of the product.

The most important advantage of this product, however, is that it is a highly nutritious and high protein containing product which can supply the dietary requirements of humans or pets at a low cost.

Having fully defined my new and unique invention, I claim:

1. A process for producing a shelf stable high protein simulated cheese product consisting essentially of: mixing from about 1 percent to about 25 percent by weight cheese; from about 5 percent to about 35 percent by weight of a member selected from the group consisting of sugar, sugar equivalents, and mixtures thereof; from 5 percent to 30 percent by weight pregelatinized starch; from 10 percent to 50 percent by weight of a high protein binding agent consisting essentially of protein; and sufficient water to give a final moisture content of from 20 percent to 40 percent by weight; wherein the total weight percentage is equal to 100 percent; then forming the mixture into the shape of a cheese food product by heating the mixture to a temperature of from about 125° F. to about 195° F. and while maintaining it at that temperature extruding the heated mixture into small strands.

References Cited
UNITED STATES PATENTS

| | | | |
|---|---|---|---|
| 3,202,514 | 8/1965 | Burgess et al. | 99—7 X |
| 3,310,406 | 3/1967 | Webster | 99—117 X |
| 3,121,014 | 2/1964 | Jokay | 99—117 X |
| 3,075,842 | 1/1963 | Shaver | 99—117 X |
| 3,573,930 | 4/1971 | Dale | 99—115 |

DAVID M. NAFF, Primary Examiner

U.S. Cl. X.R.

99—14, 17, 20, 150 R